(12) United States Patent
Shin et al.

(10) Patent No.: US 12,094,253 B2
(45) Date of Patent: Sep. 17, 2024

(54) INTERACTION DETECTION METHOD AND APPARATUS

(71) Applicant: MAY-I INC., Seoul (KR)

(72) Inventors: In Sik Shin, Seoul (KR); Jun Hyuk Park, Seoul (KR); Jin Woo Park, Incheon (KR); Gil Hyun Nam, Seoul (KR)

(73) Assignee: MAY-I INC., Seoul (KR)

( * ) Notice: Subject to any disclaimer, the term of this patent is extended or adjusted under 35 U.S.C. 154(b) by 345 days.

(21) Appl. No.: 17/769,377

(22) PCT Filed: Aug. 21, 2020

(86) PCT No.: PCT/KR2020/011195
§ 371 (c)(1),
(2) Date: Apr. 15, 2022

(87) PCT Pub. No.: WO2021/075701
PCT Pub. Date: Apr. 22, 2021

(65) Prior Publication Data
US 2023/0326252 A1    Oct. 12, 2023

(30) Foreign Application Priority Data

Oct. 18, 2019   (KR) .......................... 10-2019-0129709

(51) Int. Cl.
*G06K 9/00*    (2022.01)
*G06T 7/73*    (2017.01)
(Continued)

(52) U.S. Cl.
CPC ................ *G06V 40/28* (2022.01); *G06T 7/73* (2017.01); *G06V 10/25* (2022.01); *G06V 10/762* (2022.01);
(Continued)

(58) Field of Classification Search
CPC ...... G06V 40/28; G06V 10/25; G06V 10/762; G06V 10/82; G06V 20/52; G06V 40/103;
(Continued)

(56) References Cited

U.S. PATENT DOCUMENTS 11,615,430 B1 * 3/2023 Sharma .............. G06Q 30/0201
                                                705/7.29
2019/0205933 A1 * 7/2019 Glaser ................ G06Q 30/0275

FOREIGN PATENT DOCUMENTS

KR    1020130027414 A    3/2013
KR    1020150093532 A    8/2015
(Continued)

OTHER PUBLICATIONS

International Search Report of PCT/KR2020/011195 dated Jan. 29, 2021.

*Primary Examiner* — Xin Jia
(74) *Attorney, Agent, or Firm* — Dinsmore & Shohl LLP; Yongsok Choi, Esq.

(57) ABSTRACT

An interaction detection method is provided. The method includes the steps of: acquiring one or more frame images; acquiring pose data of a first object using information on a plurality of feature points detected for the first object from a first frame image; determining occurrence of an interaction of the first object using the pose data of the first object; estimating a region of interest (ROI) of the first object using the information on the plurality of feature points; and acquiring information on a product corresponding to the region of interest of the first object.

5 Claims, 6 Drawing Sheets

(51) Int. Cl.
  *G06V 10/25*   (2022.01)
  *G06V 10/762*  (2022.01)
  *G06V 10/82*   (2022.01)
  *G06V 40/20*   (2022.01)

(52) U.S. Cl.
  CPC .... *G06V 10/82* (2022.01); *G06T 2207/20084* (2013.01); *G06T 2207/30196* (2013.01)

(58) Field of Classification Search
  CPC .... G06V 40/107; G06V 10/761; G06V 40/10; G06V 10/40; G06T 7/73; G06T 2207/20084; G06T 2207/30196; G06T 7/251; G06T 7/75; G06T 2207/10016; G06T 2207/20076; G06T 7/11; G06T 7/194; G06N 3/02
  See application file for complete search history.

(56) References Cited

FOREIGN PATENT DOCUMENTS

| | | |
|---|---|---|
| KR | 1020160149185 A | 12/2016 |
| KR | 1020170022078 A | 3/2017 |
| KR | 1020180062619 A | 6/2018 |
| KR | 1020180073432 A | 7/2018 |

\* cited by examiner

FIG. 4A
FIG. 4B
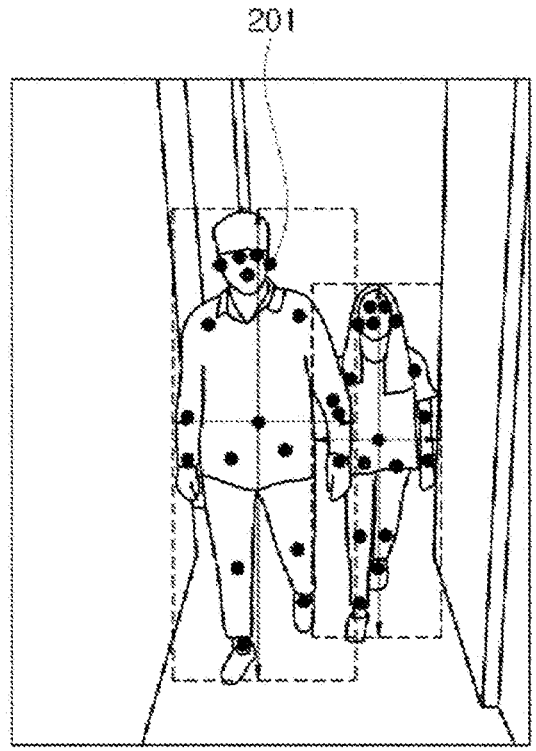
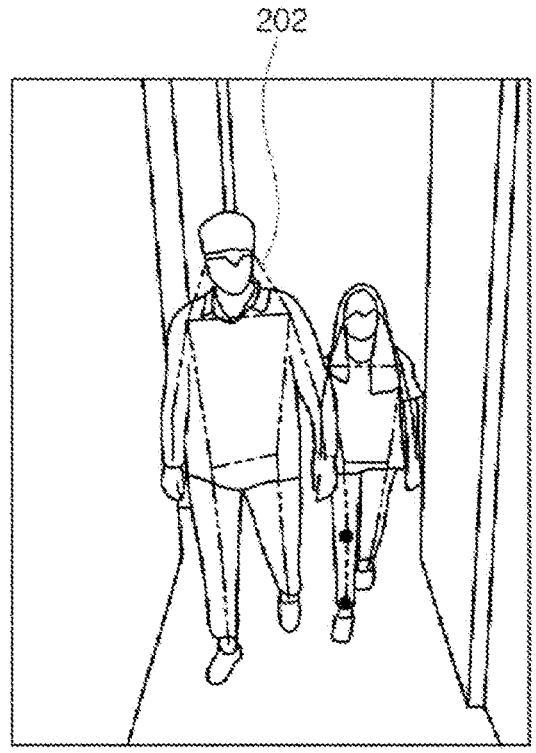
FIG. 5
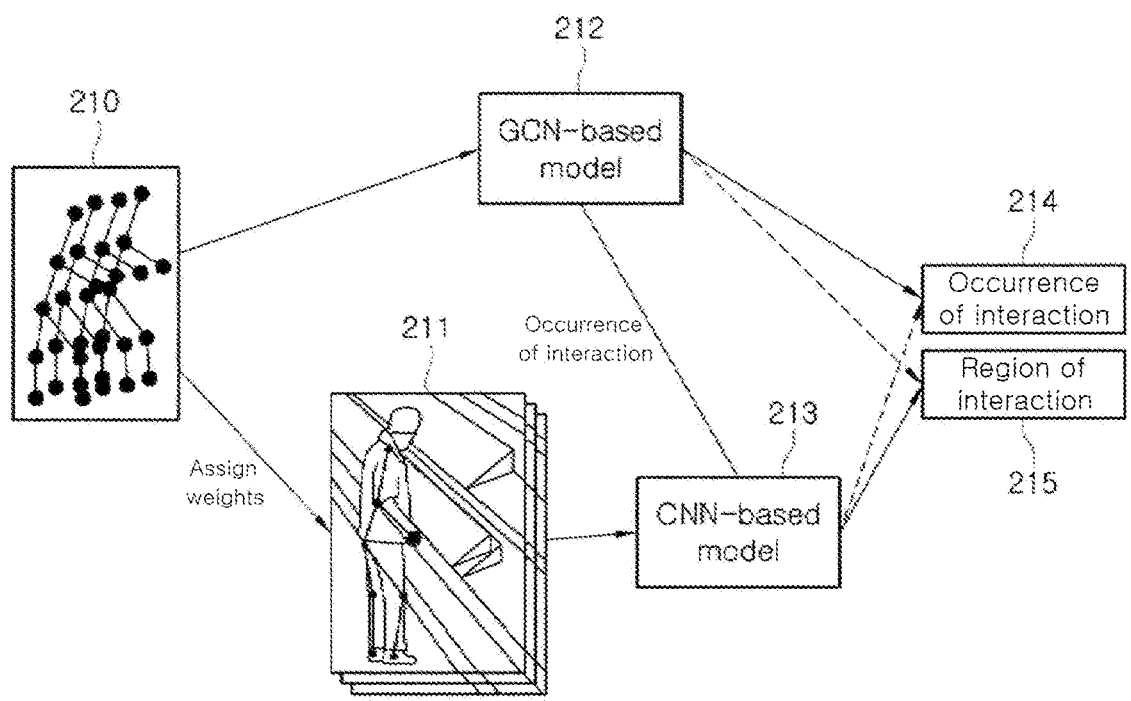

INTERACTION DETECTION METHOD AND APPARATUS

CROSS-REFERENCE TO RELATED APPLICATION(S)

This application is a continuation application of Patent Cooperation Treaty (PCT) International Application No. PCT/KR2020/011195 filed on Aug. 21, 2020, which claims priority to Korean Patent Application No. 10-2019-0129709 filed on Oct. 18, 2019. The entire contents of PCT International Application No. PCT/KR2020/011195 and Korean Patent Application No. 10-2019-0129709 are hereby incorporated by reference.

FIELD OF THE INVENTION

The present invention relates to an interaction detection method and apparatus, and more specifically to a method and apparatus for detecting a person's interaction with a product object.

BACKGROUND

In order to predict a customer's demand for a specific product displayed in a store, information on the customer's interaction with the product may be used. Typically, information on a customer's interaction with a product in a store may be predicted by means of a record of the customer's purchase of the product. However, when the interaction with the product has occurred but the customer does not purchase the product, there is a limitation that it is not possible to accurately predict the customer's demand for the product. Therefore, there is a need for a technique capable of accurately predicting a customer's interaction with a product.

SUMMARY OF THE INVENTION

Embodiments of the present invention provide a method and apparatus for detecting an interaction with a product using a plurality of frame included in a video.

An interaction detection method according to one embodiment of the invention may comprise the steps of: acquiring one or more frame images; acquiring pose data of a first object using information on a plurality of feature points detected for the first object from a first frame image; determining occurrence of an interaction of the first object using the pose data of the first object; estimating a region of interest (ROI) of the first object using the information on the plurality of feature points; and acquiring information on a product corresponding to the region of interest of the first object.

According to one embodiment of the invention, the step of determining occurrence of an interaction of the first object may comprise the step of determining the occurrence of the interaction of the first object by inputting the pose data of the first object into a first neural network trained to determine occurrence of an interaction of an object.

According to one embodiment of the invention, the step of estimating a region of interest of the first object may comprise the step of estimating the region of interest of the first object by inputting the first frame image into a second neural network trained to determine a type of an interaction.

According to one embodiment of the invention, the plurality of feature points are assigned weights, and when the first object is a person object, greater weights may be assigned to feature points corresponding to arms and hands of the person object than the rest of the plurality of feature points.

According to one embodiment of the invention, the step of acquiring information on a product may comprise the steps of: removing a background of the region of interest of the first object and the first object; and extracting information on a product located in the region of interest of the first object.

According to one embodiment of the invention, the step of acquiring information on a product may comprise the steps of: measuring similarity between products on the basis of feature data of the products, and performing clustering on the products on the basis of the similarity between the products; and acquiring information on a product located in the region of interest of the first object from cluster information corresponding to the feature data of the product located in the region of interest of the first object.

An interaction detection apparatus according to another embodiment of the invention comprises a processor that may be configured to: acquire a plurality of frame images; detect information on a plurality of feature points for a first object from a first frame image; acquire pose data of the first object using the information on the plurality of feature points; determine occurrence of an interaction of the first object using the pose data of the first object; assign weights to the information on the plurality of feature points to predict a region of interest (ROI) of the first object; and acquire information on a product corresponding to the region of interest.

BRIEF DESCRIPTION OF THE DRAWINGS

FIG. 4A illustrates feature point information of an object detected according to one embodiment of the invention.

FIG. 4B illustrates feature point information of an object detected according to one embodiment of the invention.

FIG. 5 illustrates how to detect occurrence of an interaction and a region of the occurrence of the interaction according to one embodiment of the invention.

DETAILED DESCRIPTION

Figure 1:
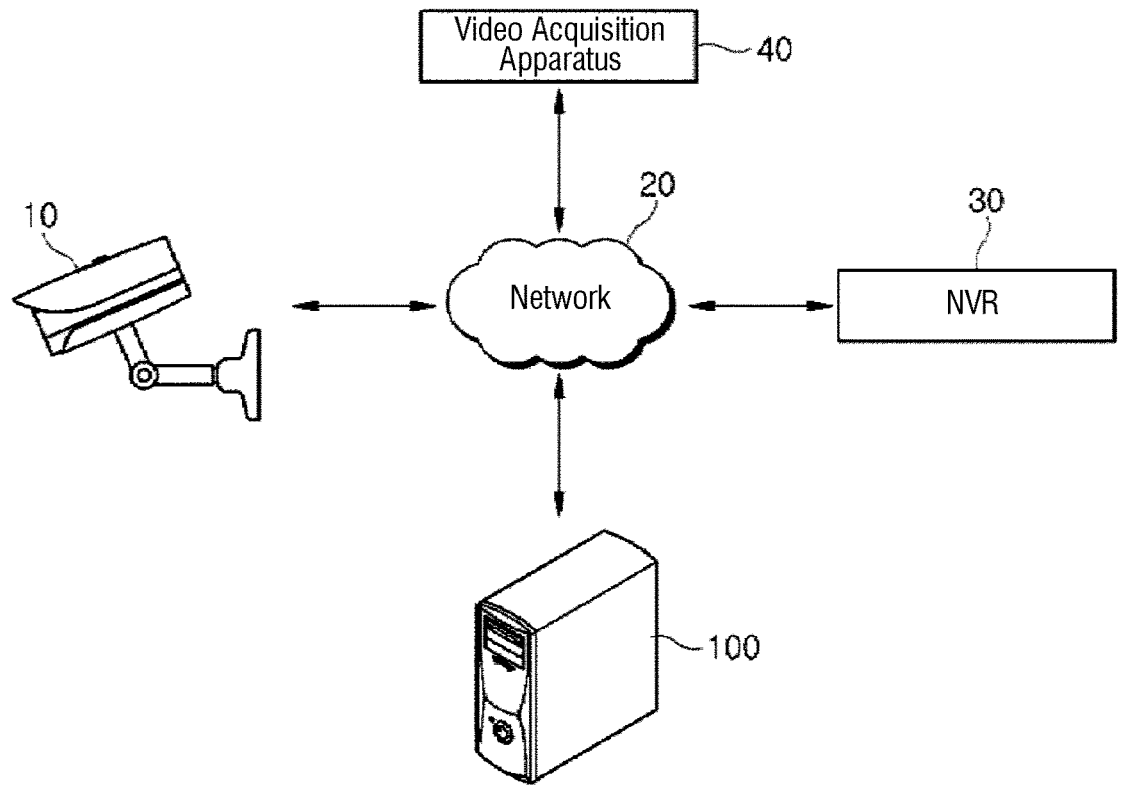
FIG. 1 shows an example of an interaction detection system comprising an interaction detection apparatus according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various embodiments of the present invention will be described in detail with reference to the accompanying drawings to enable those skilled in the art to easily implement the invention.

An interaction detection system comprising an interaction detection apparatus according to one embodiment of the invention will be described in detail below with reference to FIG. 1.

According to one embodiment of the invention, an interaction detection apparatus 100 may acquire a plurality of frame images included in a video from a video acquisition apparatus 40 via a network 20, and the video acquisition apparatus 40 may acquire a video transferred from a camera 10 to an NVR 30 via the network 20. It should be noted that the interaction detection apparatus 100 and the video acquisition apparatus 40 may be physically implemented as one piece of hardware according to one embodiment of the invention, and the interaction detection apparatus 100 and the camera 10 may also be physically implemented as one piece of hardware according to another embodiment of the invention.

According to one embodiment of the invention, the interaction detection apparatus 100 may be configured to: detect information on a plurality of feature points for a first object from a first frame image of the plurality of acquired frame images; acquire pose data of the first object using the information on the plurality of feature points; determine occurrence of an interaction of the first object using the pose data of the first object; assign weights to the information on the plurality of feature points to estimate a region of interest (ROI) of the first object; and acquire information on a product corresponding to the region of interest. The foregoing will be described in more detail below with reference to FIGS. 3 to 10.

According to one embodiment of the invention, the interaction detection apparatus 100 may detect occurrence of a customer's interaction with a product using a video of a store. Further, according to one embodiment of the invention, the interaction detection apparatus 100 may detect occurrence of a customer's interaction with a product only when the customer approaches a product stand, in order to reduce the amounts of computing operations and memory usage.

The internal configuration of the interaction detection apparatus 100 according to one embodiment of the invention will be described in detail below with reference to FIG. 2.

According to one embodiment of the invention, the interaction detection apparatus 100 may comprise an input/output interface 140, a memory 110, a processor 120, and a communication module 130. The memory 110 may be a computer-readable recording medium, and may include random access memory (RAM), read only memory (ROM), and a permanent mass storage device such as a disk drive. Further, the memory 110 may temporarily or permanently store program codes and settings for controlling the interaction detection apparatus 100, information on products, pose data of objects, and information on feature points.

The processor 120 may be configured to process instructions of a computer program by executing basic arithmetic, logic, and input/output operations. The instructions may be provided to the processor 120 by the memory 110 or the communication module 130. For example, the processor 120 may be configured to execute received instructions according to program codes stored in a storage device (e.g., the memory 110).

The communication module 130 may function to communicate with an external server via the network. As an example, a request generated by the processor 120 of the interaction detection apparatus 100 according to program codes stored in a storage device (e.g., the memory 110) may be transferred to the external server via the network under the control of the communication module 130. In contrast, the interaction detection apparatus 100 may receive control signals or commands, contents, files, or the like, which are provided under the control of a processor of the external server, via the network through the communication module 130. For example, the control signals or commands of the external server received through the communication module 130 may be transferred to the processor 120 or the memory 110, and the contents or files may be stored in a storage medium, which may be further provided in the interaction detection apparatus 100.

Further, the communication module 130 may communicate with the external server via the network. Although a communication scheme thereof is not particularly limited, the network may be a local area wireless communication network. For example, the network may be a Bluetooth, Bluetooth Low Energy (BLE), or WiFi communication network.

The input/output interface 140 may receive a user's input and display output data. The input/output interface 140 according to one embodiment of the invention may show a region of interest (ROI) on an acquired video in an overlay manner on a display.

Figure 2:
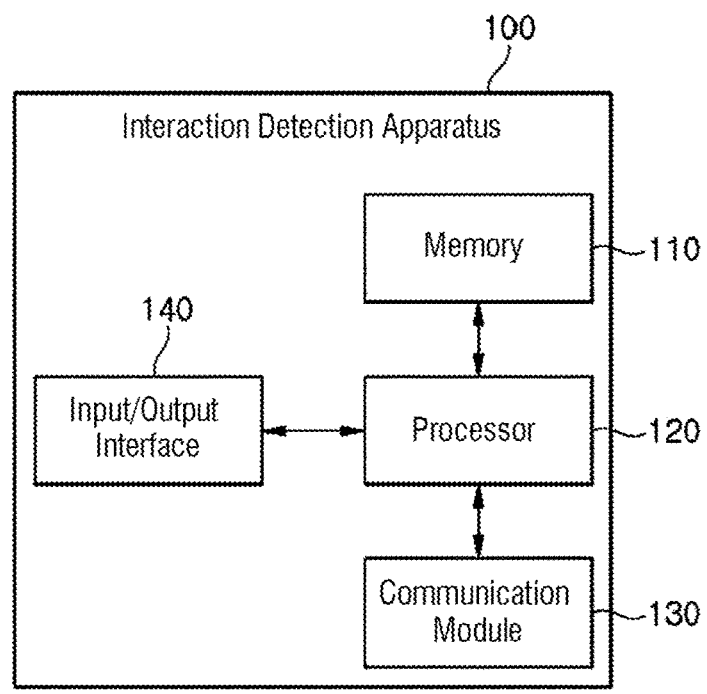
FIG. 2 illustrates the internal configuration of an interaction detection apparatus according to one embodiment of the invention.

In addition, according to other embodiments of the invention, the interaction detection apparatus 100 may further include other components than the components illustrated in FIG. 2. However, most of conventional components need not be explicitly illustrated. For example, the interaction detection apparatus 100 may include a battery and a charging device for supplying power to internal components of the interaction detection apparatus 100. Alternatively, the interaction detection apparatus 100 may be implemented to include at least some of the above-described input/output devices, or may further include other components such as a transceiver, a global positioning system (GPS) module, various sensors, and a database.

Further, although not illustrated in FIG. 2, one or more camera modules may be further included in the interaction detection apparatus 100. The camera module may include one or more individual cameras. For example, the camera module may be a camera module embedded in the interaction detection apparatus 100, or may be a module for connection with a separately provided camera device.

Figure 3:
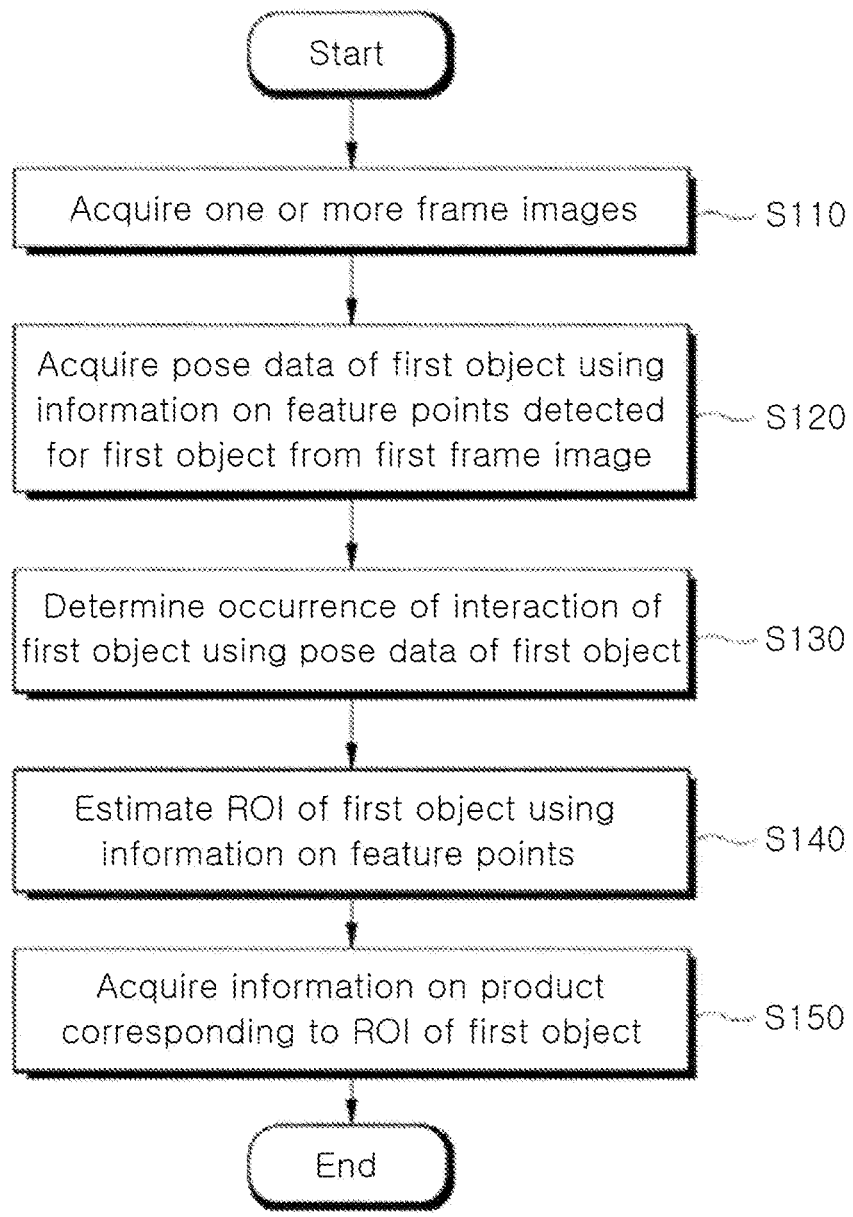
FIG. 3 is a flowchart of an interaction detection method according to one embodiment of the invention.

An interaction detection method according to one embodiment of the invention will be described in detail below with reference to FIG. 3.

According to one embodiment of the invention, the interaction detection apparatus may acquire one or more frame images (S110). The one or more frame images are acquired from a video on a frame basis, and may be sequentially acquired over time. Thus, the description will be made on the assumption that frame images to be described below are sequentially acquired from a single video unless otherwise specified.

According to one embodiment of the invention, the interaction detection apparatus may detect information on a plurality of feature points for a first object from a first frame image (S120). The information on the plurality of feature points of the first object may be detected using a key point estimation method commonly used in the relevant field. When the first object is a person object, the information on the feature points of the first object may include a head center point and a body center point of the person object according to one embodiment of the invention, and may further include information on feature points of eyes, ears, a nose, shoulders, arms, hands, both ends of a pelvis, knees, and feet of the person object according to another embodiment of the invention. However, it should be noted that the information on the feature points of the person object is not limited thereto, and the regions of the person object corresponding to the feature points may be diversely changed by those skilled in the art according to the objects of the invention.

According to one embodiment of the invention, the interaction detection apparatus may acquire pose data of the first object using the information on the plurality of feature points (S120). According to one embodiment of the invention, the interaction detection apparatus may acquire the pose data of the first object only when a specified condition is satisfied in order to save memory usage and computing resources. For example, when a customer's interaction with a product is to be detected in a store, the interaction detection apparatus may acquire pose data of the customer only when the customer approaches a product stand.

According to one embodiment of the invention, the interaction detection apparatus may determine occurrence of an interaction of the first object using the pose data of the first object (S130). According to one embodiment of the invention, the interaction detection apparatus may determine the occurrence of the interaction of the first object by inputting the pose data of the first object into a first neural network trained to determine occurrence of an interaction. According to one embodiment of the invention, the pose data of the first object may be graph data, and the first neural network may be a graph convolutional network (GCN)-based neural network. However, it should be noted that the format of the pose data and the structure of the neural network algorithm are not limited thereto, and the neural network algorithm may be changed as the format of the pose data is changed. A method of determining occurrence of an interaction of an object will be described in detail below with reference to FIG. 6.

According to one embodiment of the invention, the interaction detection apparatus may estimate a region of interest (ROI) of the first object using the information on the plurality of feature points (S140). According to one embodiment of the invention, the interaction detection apparatus may estimate the region of interest of the first object by inputting the first frame image into a second neural network trained to determine a type of an interaction of an object. A method of estimating a region of interest of an object will be described in detail below with reference to FIG. 7.

According to one embodiment of the invention, the interaction detection apparatus may acquire information on a product corresponding to the region of interest (S150). According to one embodiment of the invention, the interaction detection apparatus may measure similarity between products on the basis of feature data of the products, and perform clustering on the basis of the similarity between the products. Further, the interaction detection apparatus may acquire information on a product located in the region of interest of the first object from cluster information corresponding to the feature data of the product located in the region of interest of the first object. The foregoing will be described in more detail with reference to FIGS. 8A to 10.

FIGS. 4A and 4B illustrate feature point information of an object detected according to one embodiment of the invention.

Feature point information may include information on a plurality of feature points 201 detected using a key point estimation method commonly used in the relevant field, information on straight lines 202 connecting the plurality of feature points, and graph information generated to correspond to the object using the feature points as nodes and the straight lines connecting the feature points as edges between the nodes. Hereinafter, the description will be made on the assumption that a person object is detected.

According to one embodiment of the invention, when the interaction detection apparatus performs an interaction detection method for a person object, the information on the feature points of the first object may include information on feature points of a head center, a body center, eyes, ears, a nose, shoulders, arms, hands, both ends of a pelvis, knees, and feet of the person object. The above feature points may be acquired using softmax regression commonly used in the relevant field.

In this case, the interaction detection apparatus according to one embodiment of the invention may acquire pose data of the person object using information on feature points corresponding to the eyes, ears, nose, shoulders, arms, hands, both ends of the pelvis, knees, and feet of the person object among the feature points of the person object, and information on straight lines connecting the respective feature points. More specifically, the interaction detection apparatus may acquire pose data for estimating a current posture of the person object by using a graph generated using the feature points and the straight lines connecting the feature points. However, since the interaction detection method according to some embodiments of the invention is intended to detect an interaction of a person object with a product, the pose data may be acquired on the basis of a part of the feature points.

Specifically, according to one embodiment of the invention, the interaction detection apparatus may assign a weight to each of the plurality of feature points of the person object. Since the information on the feature points corresponding to the arms or hands of the person object is most important in detecting an interaction of the person object with a product, the interaction detection apparatus according to one embodiment of the invention may assign greater weights to the feature points corresponding to the arms or hands of the person object among the plurality of feature points than the rest of the feature points. The information on the plurality of feature points assigned the above weights may be used as input data for a neural network to be described below.

According to one embodiment of the invention, the interaction detection apparatus may acquire pose data for each of a plurality of sequentially acquired frame images, and the acquired pose data may be generated in the form of a time series graph according to the sequence of the plurality of frame images.

FIG. 5 illustrates how to detect occurrence of an interaction and a region of the occurrence of the interaction according to one embodiment of the invention.

According to one embodiment of the invention, the interaction detection apparatus may determine occurrence of an interaction 214 using a first neural network 212, and estimate a region of the occurrence of the interaction 215 using a second neural network 213.

According to one embodiment of the invention, the interaction detection apparatus may input pose data 210 of an object into the first neural network 212 to determine occurrence of an interaction 214 of the object. The first neural network may include a neural network of various structures that may be selected by those skilled in the art, and may preferably include a GCN-based neural network.

Further, the interaction detection apparatus may input frame images 211 into the second neural network 213 to estimate a region of the occurrence of the interaction 215 of the object. The second neural network may include a neural network of various structures that may be selected by those skilled in the art, and may preferably include a convolutional neural network (CNN)-based neural network.

In addition, according to one embodiment of the invention, the interaction detection apparatus may further input weights assigned to a plurality of feature points into the second neural network 213. In this case, since the second neural network 213 may detect the region of the occurrence of the interaction on the basis of regions of the feature points assigned greater weights, it is possible to generate more accurate output values than when only the frame images 211 are inputted.

That is, according to one embodiment of the invention, the interaction detection apparatus may determine the occurrence and type of the interaction using the first neural network 212, and may estimate the region of the occurrence of the interaction and a region of interest of the object including product information using the second neural network 213. Further, it should be noted that the interaction detection apparatus according to another embodiment of the invention may use the output values of the second neural network 213 as well as those of the first neural network 212 in order to determine the occurrence of the interaction, and may use the output values of the first neural network 212 as well as those of the second neural network 213 in order to estimate the region of the occurrence of the interaction. In this case, it is possible to acquire a more accurate interaction detection result than when a single neural network result is used.

Figure 6:
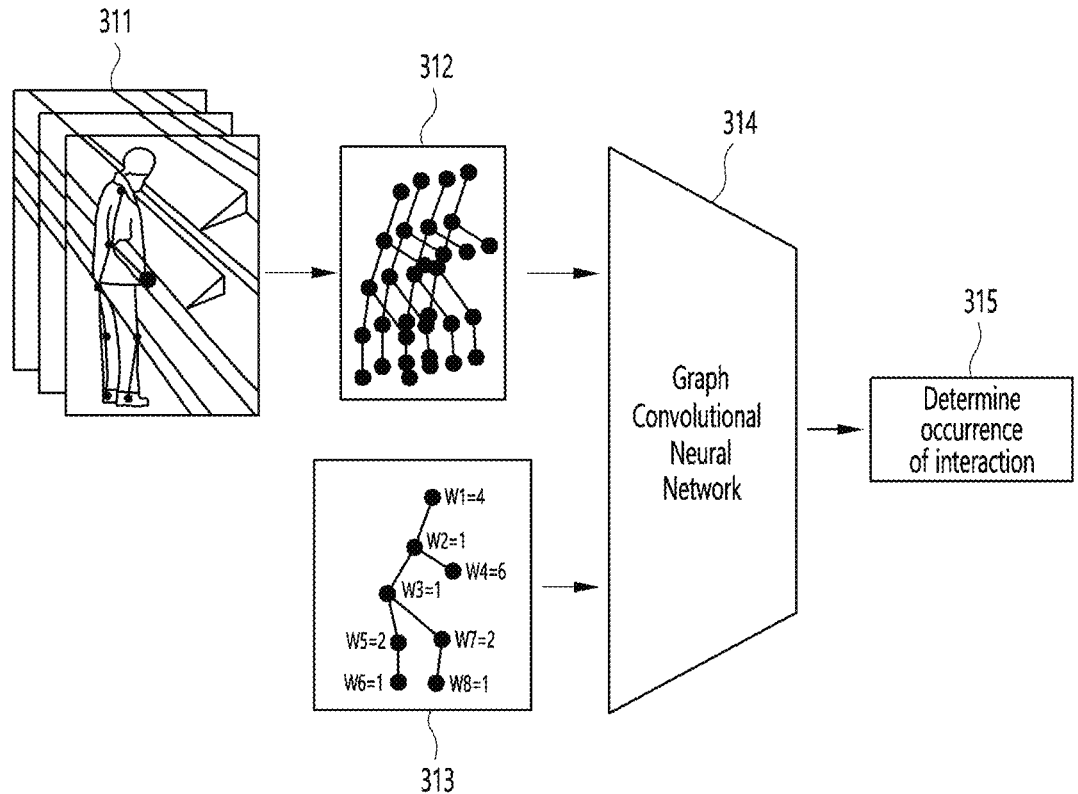
FIG. 6 illustrates how to determine occurrence of an interaction according to one embodiment of the invention.

FIG. 6 illustrates how to determine occurrence of an interaction according to one embodiment of the invention.

According to one embodiment of the invention, the interaction detection apparatus may acquire pose data using information on a plurality of feature points acquired from one or more frame images 311, and then convert the pose data acquired from the frame images into a discrete time series graph 312. Thereafter, the interaction detection apparatus may input the discrete time series graph 312 into a GCN-based neural network 314 to determine occurrence of an interaction 315.

According to another embodiment of the invention, the interaction detection apparatus may further input information on weights 313 assigned to the plurality of feature points into the GCN-based neural network 314. In this case, the interaction detection apparatus may process the frame images on the basis of the information on the weights. In this case, the GCN-based neural network 314 may determine the occurrence of the interaction on the basis of the feature points having greater weights than the others. For example, in the case of detecting an interaction of a person object in a store, the interaction detection apparatus may assign greater weights to the feature points corresponding to arms and hands of the person object than those of the other feature points, and the GCN-based neural network 314 may determine the occurrence of the interaction on the basis of regions corresponding to the arms and hands of the person object.

Figure 7:
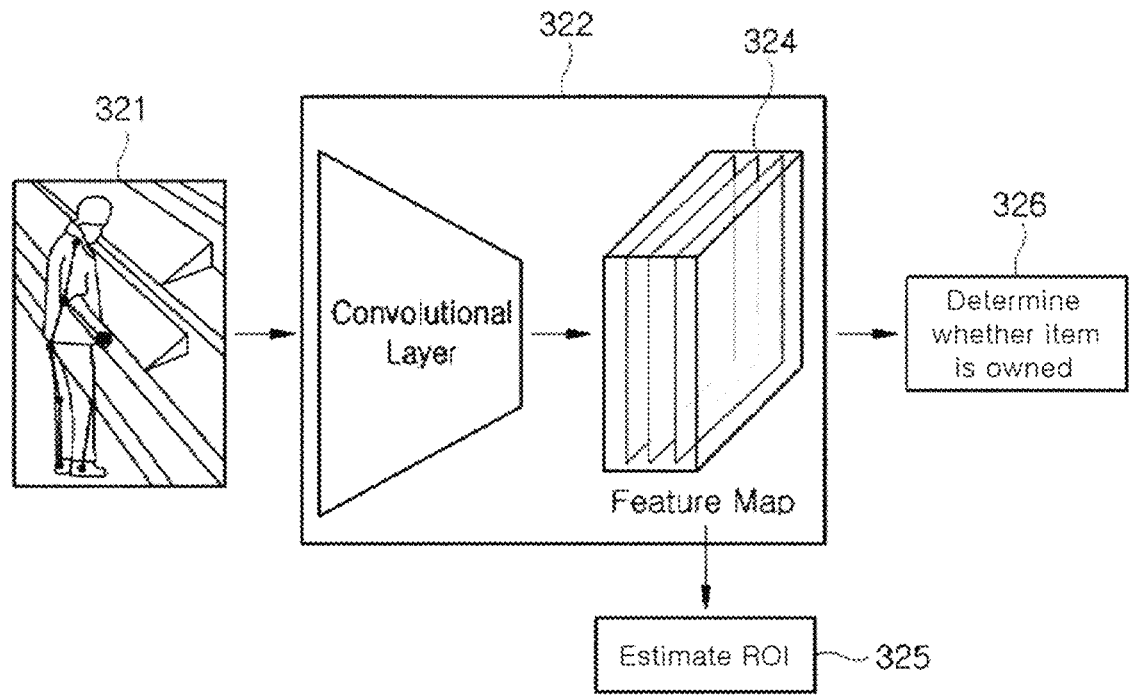
FIG. 7 illustrates how to detect a region of occurrence of a user's interaction according to one embodiment of the invention.

FIG. 7 illustrates how to detect a region of occurrence of a user's interaction according to one embodiment of the invention.

According to one embodiment of the invention, the interaction detection apparatus may estimate 325 a region of interest (ROI) of an object by inputting a frame image 321 into a CNN-based neural network 322 trained to determine 326 whether an item is owned. In this case, the output data of the CNN-based neural network 322 may indicate whether the object owns the item when an interaction of the object with the item occurs. For example, when occurrence of a person's interaction with a product is detected by the above-described GCN-based neural network, the CNN-based neural network 322 according to the embodiment of the invention may estimate whether the person is still holding the item or has put it back down.

According to one embodiment of the invention, the interaction detection apparatus may estimate 325 a region of interest (ROI) of an object by using a feature map 324 of the CNN-based neural network 322 trained to determine 326 whether an item is owned. More specifically, the feature map 324 used by the interaction detection apparatus according to the embodiment of the invention may be a result value immediately preceding an activation function for generating a final result in the CNN-based neural network 322. In this case, the interaction detection apparatus may analyze a class activation map (CAM) to estimate a region of interest of the object that has a great influence on decision making of the neural network on the basis of the feature map 324.

Figure 8A:
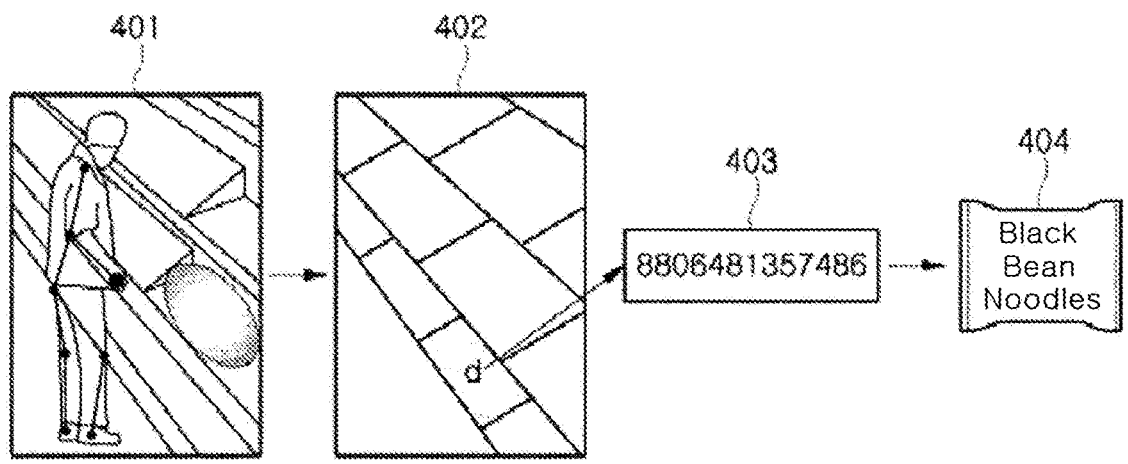
FIG. 8A illustrates how to acquire information on a product with which an interaction occurs according to one embodiment of the invention.
Figure 8B:
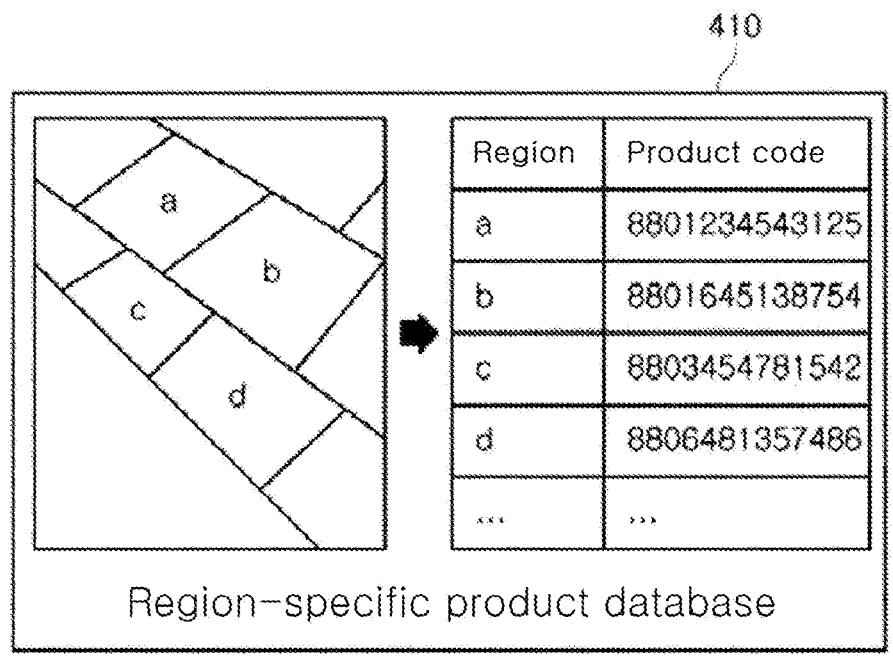
FIG. 8B illustrates how to acquire information on a product with which an interaction occurs according to one embodiment of the invention.

FIGS. 8A to 10 illustrate how to acquire information on a product with which an interaction occurs according to one embodiment of the invention. FIGS. 8A and 8B illustrate how the interaction detection apparatus acquires product information when products are arranged in a specified arrangement.

According to one embodiment of the invention, the interaction detection apparatus may acquire information on a product corresponding to a region of interest of the object on the basis of a region-specific product database 410. More specifically, the interaction detection apparatus may match a region of interest 401 of the object estimated from a frame image with information on a specified product region 402. Code information 403 on a product corresponding to the product region may be acquired from the region-specific product database 410 on the basis of the matched information on the product region. Thereafter, the interaction detection apparatus may acquire final information 404 on the product with which the interaction occurs from a product-specific code database using the code information 403 on the product.

However, according to the embodiment of the invention, there is a problem if the products are not arranged in a specified arrangement or not clearly classified by region. A case in which product information is not clearly classified by region will be described in detail below with reference to FIG. 9.

Figure 9:
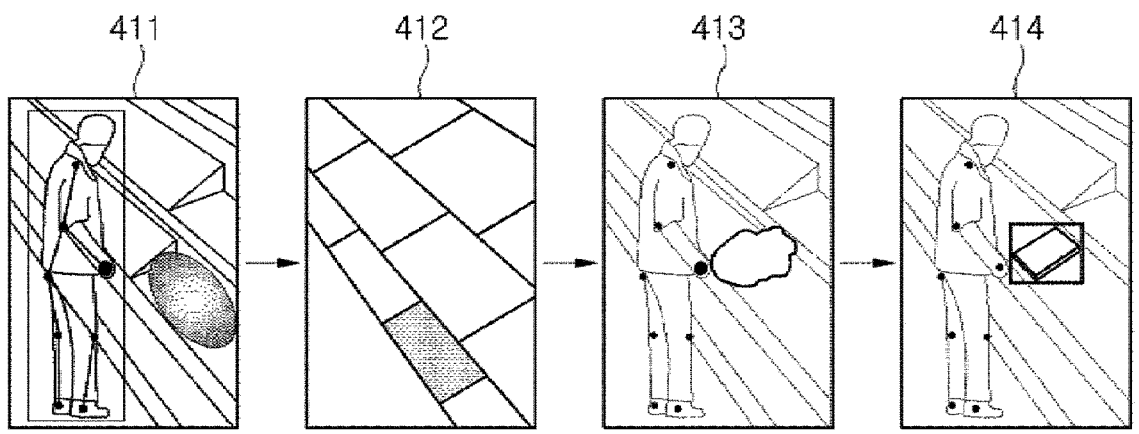
FIG. 9 illustrates how to acquire information on a product with which an interaction occurs according to one embodiment of the invention.

Referring to FIG. 9, the interaction detection apparatus according to one embodiment of the invention may remove 412 a background excluding an interaction target product from a frame image 411. More specifically, the interaction detection apparatus may remove a region of an object on the basis of pose data of the object, and remove 413 a background excluding an image of the interaction target product included in a region of interest. In this case, the interaction detection apparatus may extract 414 only the image of the interaction target product.

According to one embodiment of the invention, when a product database is built on the basis of product images, the interaction detection apparatus may easily acquire information on a product corresponding to the extracted image. However, it is difficult to build a product database on the basis of product images because an image of a product may vary depending on an angle at which the product is photographed, and the accuracy of the acquired information on the product is low even if the product database is built on the basis of the product images. As a solution to the foregoing, a product recognition method according to one embodiment of the invention will be described below with reference to FIG. 10.

Figure 10:
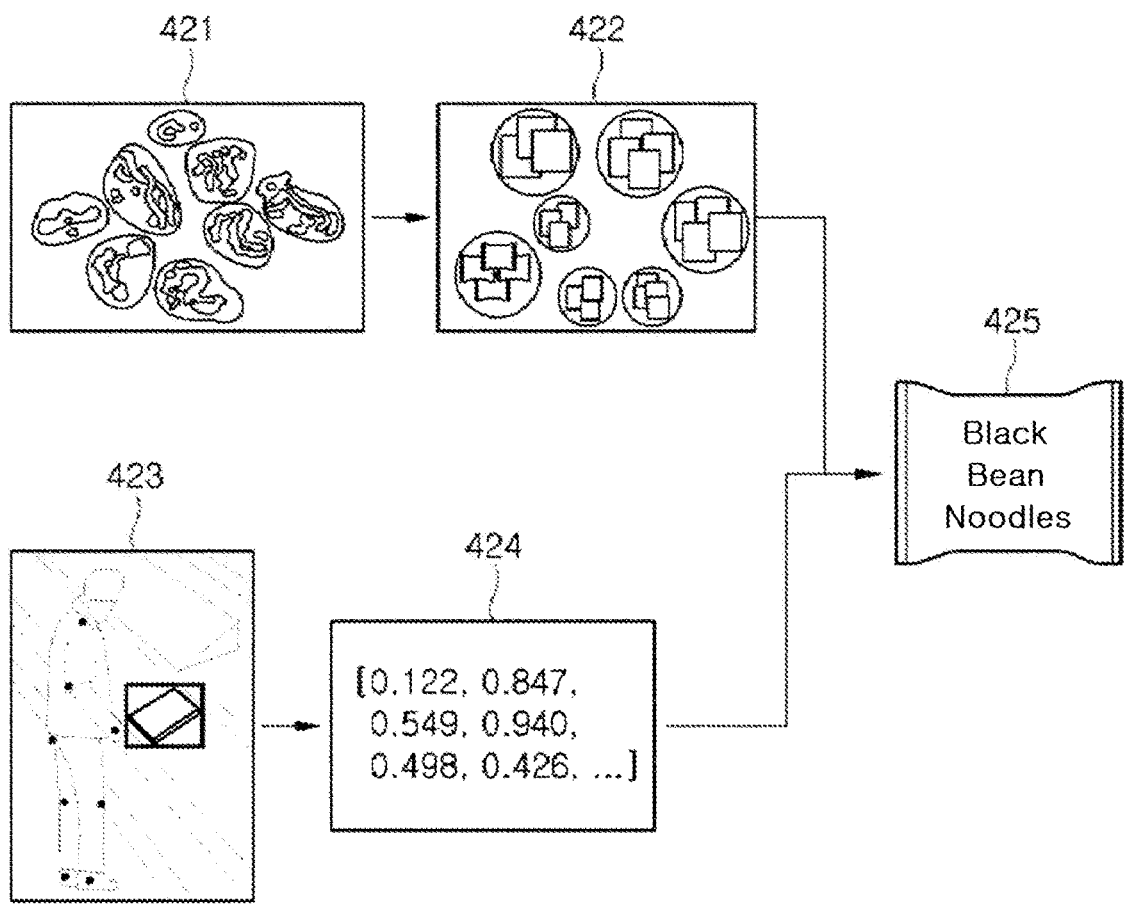
FIG. 10 illustrates how to acquire information on a product with which an interaction occurs according to one embodiment of the invention.

Referring to FIG. 10, the interaction detection apparatus according to one embodiment of the invention may embed external feature data of an extracted product image 423 into vector data 424.

Meanwhile, the interaction detection apparatus according to the embodiment of the invention may perform clustering 421 on a plurality of similar products, among products included in a product database, with respect to the vector data. As a result, the products corresponding to the respective vector data may also be clustered 422.

Accordingly, the interaction detection apparatus according to one embodiment of the invention may acquire accurate product information 425 by comparing the vector data 424 of the extracted product image with information on a plurality of clusters 422 corresponding to the products included in the product database.

The above-described apparatus may be implemented with hardware components, software components, and/or a combination of the hardware components and software components. For example, the apparatus and components described in connection with the embodiments of the invention may be implemented with one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may run an operating system (OS) and one or more software applications executed on the operating system. Further, in response to the execution of the software, the processing device may access, store, operate, process, and create data. For the convenience of understanding, it is described in some cases that one processing device is used. However, those skilled in the art would understand that the processing device may include a plurality of pieces and/or types of processing elements. For example, the processing device may include a plurality of processors, or include a single processor and a single controller. Further, the processing device may have a different processing configuration such as a parallel processor.

The software may include computer programs, codes, instructions, or a combination of the foregoing, and may configure the processing device to operate as desired or instruct the processing device in an independent or collective manner. The software and/or data may be permanently or temporarily embodied in some type of machine, component, physical equipment, virtual equipment, computer storage medium or device, or transmitted signal wave, so as to be interpreted by the processing device or provide instructions or data to the processing device. The software may be distributed on computer systems connected to a network, and stored or executed in a distributed manner. The software and data may be stored on one or more computer-readable recording media.

The method according to the embodiments of the invention may be implemented in the form of program instructions that can be executed by various computer components, and stored on a computer-readable recording medium. The computer-readable recording medium may include program instructions, data files, and data structures, separately or in combination. The program instructions stored on the computer-readable recording medium may be specially designed and configured for the embodiments of the invention, or may also be known and available to those skilled in the computer software field. Examples of the computer-readable recording medium include the following: magnetic media such as hard disks, floppy disks, and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be configured to operate as one or more software modules to perform the operations of the embodiments of the invention, and vice versa.

Although the embodiments of the invention have been described above in terms of the limited embodiments and drawings, various modifications and changes may be made from the above description by those skilled in the art. For example, appropriate results may be achieved even if the described techniques are performed in a different order from the described method, and/or the components of the described system, structure, apparatus, circuit, and the like are coupled or combined, or replaced with other components or equivalents, in a different form from the described method.

Therefore, other implementations, other embodiments, and equivalents of the appended claims will also fall within the scope of the claims.

What is claimed is:

1. An interaction detection method comprising the steps of:
   acquiring one or more frame images;
   acquiring pose data of a first object using information on a plurality of feature points detected for the first object from a first frame image;
   determining occurrence of an interaction of the first object using the pose data of the first object;
   estimating a region of interest (ROI) of the first object using the information on the plurality of feature points; and
   acquiring information on a product corresponding to the region of interest of the first object, wherein the step of acquiring information on a product comprises the steps of:
  removing a background of the region of interest of the first object and the first object; and
  extracting information on a product located in the region of interest of the first object.

2. The interaction detection method of claim 1, wherein the step of determining occurrence of an interaction of the first object comprises the step of:
  determining the occurrence of the interaction of the first object by inputting the pose data of the first object into a first neural network trained to determine occurrence of an interaction of an object.

3. The interaction detection method of claim 1, wherein the step of estimating a region of interest of the first object comprises the step of:
  estimating the region of interest of the first object by inputting the first frame image into a second neural network trained to determine a type of an interaction.

4. The interaction detection method of claim 1, wherein the plurality of feature points are assigned weights, and
  wherein when the first object is a person object, greater weights are assigned to feature points corresponding to arms and hands of the person object, among the plurality of feature points of the first object, than the rest of the plurality of feature points.

5. The interaction detection method of claim 1, wherein the step of acquiring information on a product comprises the steps of:
  measuring similarity between products on the basis of feature data of the products, and performing clustering on the products on the basis of the similarity between the products; and
  acquiring information on a product located in the region of interest of the first object from cluster information corresponding to the feature data of the product located in the region of interest of the first object.

* * * * *